(12) United States Patent
Yun

(10) Patent No.: US 9,483,643 B1
(45) Date of Patent: Nov. 1, 2016

(54) SYSTEMS AND METHODS FOR CREATING BEHAVIORAL SIGNATURES USED TO DETECT MALWARE

(71) Applicant: Symantec Corporation, Mountain View, CA (US)

(72) Inventor: James Yun, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/656,739

(22) Filed: Mar. 13, 2015

(51) Int. Cl.
*G08B 23/00* (2006.01)
*G06F 21/56* (2013.01)

(52) U.S. Cl.
CPC ......... *G06F 21/56* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,620,992 | B2 | 11/2009 | Monastyrsky et al. |
| 8,499,354 | B1 | 7/2013 | Satish et al. |
| 8,667,583 | B2 | 3/2014 | Polyakov et al. |
| 2010/0031358 | A1 | 2/2010 | Elovici et al. |
| 2010/0077481 | A1 | 3/2010 | Polyakov et al. |
| 2010/0251363 | A1 | 9/2010 | Todorovic |
| 2013/0312095 | A1* | 11/2013 | Edwards ............... G06F 21/566 726/23 |
| 2013/0312098 | A1* | 11/2013 | Kapoor ................ G06F 21/56 726/24 |
| 2013/0347052 | A1 | 12/2013 | Choudrie |

FOREIGN PATENT DOCUMENTS

EP 2 492 833 A1 8/2012

OTHER PUBLICATIONS

Joseph Chen; Systems and Methods for Leveraging Existing Client Computing Environments as Simulated Threat Ecosystems; U.S. Appl. No. 14/290,303, filed May 29, 2014.
"Antivirus software", http://en.wikipedia.org/wiki/Antivirus_software, as accessed Jan. 16, 2015, Wikipedia, (Mar. 15, 2004).
"Common Malware Types: Cybersecurity 101", https://www.veracode.com/blog/2012/10/common-malware-types-cybersecurity-101, as accessed Jan. 16, 2015, Veracode, (Oct. 12, 2012).
Martin, Luther "A clever use for U+202E", http://www.voltage.com/blog/standards/a-clever-use-for-u202e/, as accessed Jan. 16, 2015, Blog, HP Security Voltage, (Jun. 7, 2011).

(Continued)

*Primary Examiner* — Brandon Hoffman
(74) *Attorney, Agent, or Firm* — ALG Intellectual Property, LLC

(57) ABSTRACT

The disclosed computer-implemented method for creating behavioral signatures used to detect malware may include (1) maintaining a database that identifies (A) known malicious files and behaviors exhibited by the known malicious files and (B) known non-malicious files and behaviors exhibited by the known non-malicious files and (2) creating a behavioral signature used to detect malware by (A) determining a combination of behaviors exhibited by at least one of the known malicious files, (B) identifying the number of known malicious files that exhibit each behavior within the combination, (C) identifying the number of known non-malicious files that exhibit each behavior within the combination, and (D) determining that the number of known malicious files that exhibit each behavior within the combination exceeds the number of known non-malicious files that exhibit each behavior within the combination by a certain threshold. Various other methods, systems, and computer-readable media are also disclosed.

20 Claims, 7 Drawing Sheets

(56) References Cited

OTHER PUBLICATIONS

"How do antiviruses scan for thousands of malware signatures in a short time?", http://security.stackexchange.com/questions/30362/how-do-antiviruses-scan-for-thousands-of-malware-signatures-in-a-short-time, as accessed Jan. 16, 2015, (Feb. 6, 2013).
"System call", http://en.wikipedia.org/wiki/System_call, as accesses Jan. 16, 2015, Wikipedia, (Jun. 17, 2004).
Su, Chen "Download a File Using URLDownloadToCacheFile", http://www.codeproject.com/Articles/3096/Download-a-File-Using-URLDownloadToCacheFile, as accessed Jan. 16, 2015, (Oct. 25, 2002).
"URLDownloadToCacheFile function", https://msdn.microsoft.com/en-us/library/ie/ms775122(v=vs.85).aspx, as accessed Jan. 16, 2015, Microsoft, (On or before Jan. 16, 2015).
"Should I use URLDownloadToFile?", http://stackoverflow.com/questions/5184988/should-i-use-urldownloadtofile, as accessed Jan. 16, 2015, (Mar. 3, 2011).
"How to use the URLDownloadToFile( ) Function???", http://www.cplusplus.com/forum/windows/107840/, as accessed Jan. 16, 2015, (Aug. 2, 2013).
"URLDownloadToFile function", https://msdn.microsoft.com/en-us/library/ie/ms775123(v=vs.85).aspx, as accessed Jan. 16, 2015, Microsoft, (On or before Jan. 16, 2015).
Sean M. Hittel, et al; Systems and Methods for Detecting Text Display Manipulation Attacks; U.S. Appl. No. 14/673,902, filed Mar. 31, 2015.
James Yun; Systems and Methods for Detecting Potentially Malicious Files; U.S. Appl. No. 14/666,337, filed Mar. 24, 2015.
James Yun; Systems and Methods for Detecting Potentially Malicious Applications; U.S. Appl. No. 14/656,741, filed Mar. 13, 2015.

* cited by examiner

SYSTEMS AND METHODS FOR CREATING BEHAVIORAL SIGNATURES USED TO DETECT MALWARE

BACKGROUND

As the use of internet-enabled devices grows, attackers may increasingly attempt to distribute and/or trick users into downloading illegitimate or malicious files. For example, attackers may distribute emails or post links on websites that contain malware (e.g., viruses, worms, Trojan horses, spyware, adware, etc.). Once executed by or downloaded to a computing device, a malicious file may perform one or more harmful behaviors, such as tracking a user's computing activity, gaining access to sensitive information stored within a computing device, and/or hindering the performance of a computing device.

Conventional methods for detecting and/or preventing malware attacks may involve creating signatures that identify or summarize various characteristics of malicious files. For example, an anti-malware technology may compare an incoming file with one or more malware signatures to determine whether the file is potentially malicious. Unfortunately, this conventional anti-malware technology may be unable to efficiently and/or effectively identify some malicious files using such malware signatures.

In one example, an anti-malware technology may generate malware signatures based on static characteristics (e.g., portions of code) of malicious files. Such malware signatures, however, may be unable to accurately determine the consequences of executing a malicious file. Unfortunately, this conventional anti-malware technology may need to compare incoming files to a vast number (e.g., hundreds of thousands) of malware signatures, potentially requiring excessive time and/or resource consumption.

The instant disclosure, therefore, identifies and addresses a need for improved systems and methods for creating behavioral signatures used to detect malware.

SUMMARY

As will be described in greater detail below, the instant disclosure describes various systems and methods for creating behavioral signatures used to detect malware by determining that a certain combination of behaviors is exhibited more frequently by files known to be malicious than by files known to be non-malicious. Moreover, the various systems and methods described herein may create a behavioral signature that identifies each behavior within the combination of behaviors and then apply this behavioral signature to suspicious files to detect malware.

In one example, a computer-implemented method for creating behavioral signatures used to detect malware may include (1) maintaining a database that identifies (A) known malicious files and behaviors exhibited by the known malicious files and (B) known non-malicious files and behaviors exhibited by the known non-malicious files and then (2) creating a behavioral signature used to detect malware by (A) determining a combination of behaviors exhibited by at least one of the known malicious files identified within the database, (B) identifying the number of known malicious files that exhibit each behavior within the combination of behaviors, (C) identifying the number of known non-malicious files that exhibit each behavior within the combination of behaviors, and then (D) determining that the number of known malicious files that exhibit each behavior within the combination exceeds the number of known non-malicious files that exhibit each behavior within the combination by a certain threshold.

In some examples, the method may include determining that the number of known malicious files that exhibit each behavior within the combination exceeds the number of known non-malicious files that exhibit each behavior within the combination by a certain number. Additionally or alternatively, the method may include determining that the ratio of known malicious files that exhibit each behavior within the combination to known non-malicious files that exhibit each behavior within the combination exceeds a certain ratio.

In some embodiments, the method may further include scanning the database to create at least one additional behavioral signature. In such embodiments, the method may include identifying each behavior exhibited by at least one of the known malicious files maintained in the database and identifying each possible combination of behaviors whose number of behaviors exceeds a behavior threshold. In addition, the method may include determining, for each identified combination, whether the number of known malicious files that exhibit each behavior within the combination exceeds the number of known non-malicious files that exhibit each behavior within the combination by the certain threshold. The method may then include creating a behavioral signature for each identified combination for which the number of known malicious files that exhibit each behavior exceeds the number of known non-malicious files that exhibit each behavior by the certain threshold. Moreover, the method may include allocating the identified combinations across multiple processors for analysis.

In some examples, the method may include receiving the known malicious files and the known non-malicious files from at least one endpoint computing device. Furthermore, in some examples, the method may include identifying a file on an endpoint computing device. The method may then include determining, before the endpoint computing device executes the file, that the file is potentially malicious due at least in part to the file exhibiting each behavior in the behavioral signature. In response to determining that the file is potentially malicious, the method may include preventing the endpoint computing device from executing the file.

In some embodiments, the method may further include creating a behavioral signature used to detect non-malicious files. In such embodiments, the method may include determining an additional combination of behaviors exhibited by at least one of the known non-malicious files identified within the database. The method may then include identifying the number of known non-malicious files that exhibit each behavior within the additional combination and identifying the number of known malicious files that exhibit each behavior within the additional combination. Moreover, the method may include determining that the number of known non-malicious files that exhibit each behavior within the additional combination exceeds the number of known malicious files that exhibit each behavior within the additional combination by another threshold.

In one embodiment, a system for implementing the above-described method may include (1) a database module that maintains a database that identifies (A) known malicious files and behaviors exhibited by the known malicious files and (B) known non-malicious files and behaviors exhibited by the known non-malicious files and (2) a signature module that creates a behavioral signature used to detect malware by (A) determining a combination of behaviors exhibited by at least one of the known malicious files identified within the database, (B) identifying the number of known malicious files that exhibit each behavior within the combination of behaviors, (C) identifying the number of known non-malicious files that exhibit each behavior within the combination of behaviors, and then (D) determining that the number of known malicious files that exhibit each behavior within the combination exceeds the number of known non-malicious files that exhibit each behavior within the combination by a certain threshold. In addition, the system may include at least one processor configured to execute the database module and the signature module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) maintain a database that identifies (A) known malicious files and behaviors exhibited by the known malicious files and (B) known non-malicious files and behaviors exhibited by the known non-malicious files and then (2) create a behavioral signature used to detect malware by (A) determining a combination of behaviors exhibited by at least one of the known malicious files identified within the database, (B) identifying the number of known malicious files that exhibit each behavior within the combination of behaviors, (C) identifying the number of known non-malicious files that exhibit each behavior within the combination of behaviors, and then (D) determining that the number of known malicious files that exhibit each behavior within the combination exceeds the number of known non-malicious files that exhibit each behavior within the combination by a certain threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
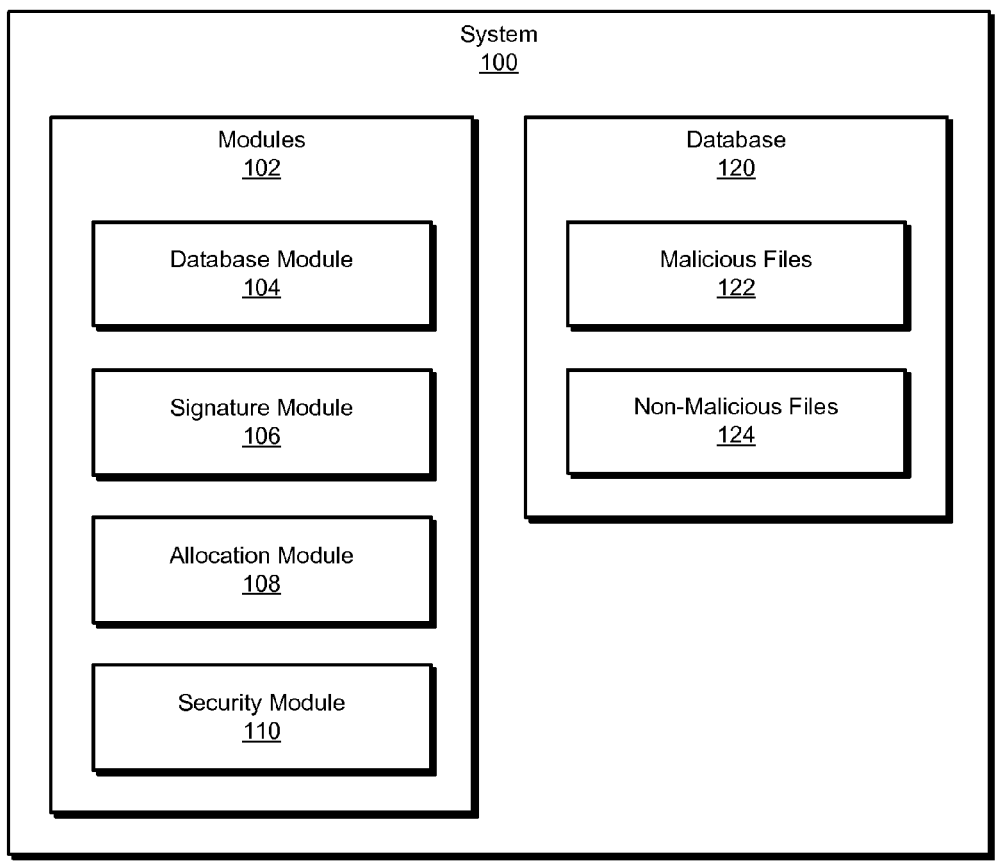
FIG. 1 is a block diagram of an exemplary system for creating behavioral signatures used to detect malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for creating behavioral signatures used to detect malware. As will be explained in greater detail below, by identifying combinations of behaviors that are indicative of malware (e.g., compared to other combinations of behaviors), the systems and methods described herein may create behavioral signatures that more accurately and/or efficiently detect malware threats. For example, by comparing the number of malicious and non-malicious files (stored within a database) that exhibit each behavior within a combination of behaviors, the disclosed systems and methods may determine whether the combination of behaviors is exhibited by malicious files more frequently (e.g., above a certain threshold) than by non-malicious files. As such, the systems and methods described herein may create behavioral signatures that contain more reliable and effective combinations of behaviors for detecting malware.

Figure 2:
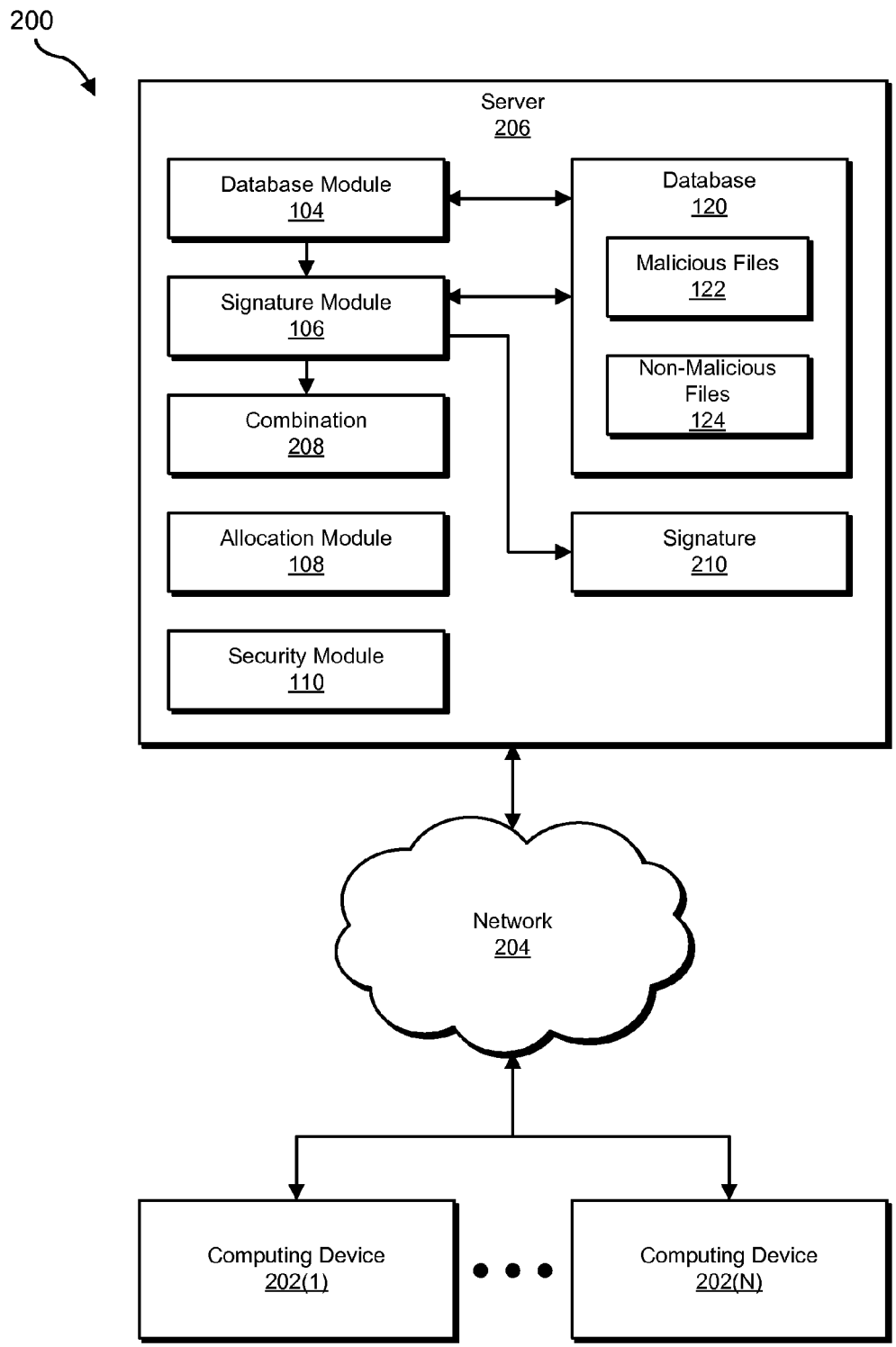
FIG. 2 is a block diagram of an additional exemplary system for creating behavioral signatures used to detect malware.

The following will provide, with reference to FIGS. 1-2, detailed descriptions of exemplary systems for creating behavioral signatures used to detect malware. Detailed descriptions of corresponding computer-implemented methods will also be provided in connection with FIG. 3. In addition, detailed descriptions of exemplary behaviors and combinations of the behaviors will be provided in connection with FIG. 4. Detailed descriptions of the number of malicious and non-malicious files that exhibit certain combinations of behaviors will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for creating behavioral signatures used to detect malware. As illustrated in this figure, exemplary system 100 may include one or more modules 102 for performing one or more tasks. For example, and as will be explained in greater detail below, exemplary system 100 may include a database module 104 that maintains a database that identifies (1) known malicious files and behaviors exhibited by the known malicious files and (2) known non-malicious files and behaviors exhibited by the known non-malicious files. Exemplary system 100 may also include a signature module 106 that creates a behavioral signature used to detect malware by (1) determining a combination of behaviors exhibited by at least one of the known malicious files identified within the database, (2) identifying the number of known malicious files that exhibit each behavior within the combination of behaviors, (3) identifying the number of known non-malicious files that exhibit each behavior within the combination of behaviors, and then (4) determining that the number of known malicious files that exhibit each behavior within the combination exceeds the number of known non-malicious files that exhibit each behavior within the combination by a certain threshold.

In addition, and as will be described in greater detail below, exemplary system 100 may include an allocation module 108 that allocates identified combinations of behaviors across multiple processors for analysis. Finally, exemplary system 100 may include a security module 110 that determines that a file is potentially malicious by determining that the file exhibits each behavior in the behavioral signature. Although illustrated as separate elements, one or more of modules 102 in FIG. 1 may represent portions of a single module or application (such as SYMANTEC ENTERPRISE SECURITY MANAGER, SYMANTEC SECURITY INFORMATION MANAGER (SSIM), SYMANTEC MANAGED SECURITY SERVICES (MSS), SYMANTEC SECURITY GATEWAY, MCAFEE ENTERPRISE SECURITY MANAGER, MCAFEE ALL ACCESS, MCAFEE TOTAL PROTECTION, MCAFEE INTERNET SECURITY, ACCELOPS' SIEM, HEWLETT-PACKARD'S ARCSIGHT, RSA's ENVISION, CISCO SECURITY MONITORING, ANALYSIS and RESPONSE SYSTEM (MARS), and/or IMMUNESECURITY LOGPOINT).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202 (1)-(N) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store malicious files 122 and/or non-malicious files 124. The term "file," as used herein, generally refers to any type or form of software, formatted portion of data, or section of code that may be executed by, installed within, downloaded to, or otherwise accessed by a computing device. Examples of files include, without limitation, executable files, image files, text files, video files, variations of one or more of the same, combinations of one or more of the same, or any other suitable files.

The term "malicious file," as used herein, generally refers to any type or form of potentially harmful file designed to perform one or more malicious actions, such as tracking a user's computing activity, accessing sensitive information stored on a computing device, or otherwise compromising the functionality or security of a computing device. Examples of malicious files include, without limitation, malware, viruses, worms, Trojan horses, adware, spyware, variations of one or more of the same, combinations of one or more of the same, or any other malicious files. In contrast, the term "non-malicious file" or "valid file," as used herein, generally refers to any type or form of legitimate or harmless file that is not designed to perform malicious actions.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7. In addition, database 120 may represent any type or form of database, such as a hierarchical database, a relational database (e.g., a Structured Query Language (SQL) database), a non-relational database (e.g., a NoSQL database), and/or any additional type of database.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. In one example, one or more of computing devices 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing devices 202(1)-(N) and/or server 206, enable computing devices 202(1)-(N) and/or server 206 to create behavioral signatures used to detect malware. For example, and as will be described in greater detail below, database module 104 may cause computing devices 202(1)-(N) and/or server 206 to maintain a database (e.g., database 120) that identifies (1) known malicious files (e.g., malicious files 122) and behaviors exhibited by malicious files 122 and (2) known non-malicious files (e.g., non-malicious files 124) and behaviors exhibited by the known non-malicious files. In addition, signature module 106 may cause computing devices 202(1)-(N) and/or server 206 to create a behavioral signature (e.g., signature 210) used to detect malware. For example, signature module 106 may cause computing devices 202(1)-(N) and/or server 206 to determine a combination of behaviors (e.g., combination 208) exhibited by at least one of malicious files 122 within database 120. Then, signature module 106 may cause computing devices 202(1)-(N) and/or server 206 to identify the number of malicious files 122 and the number of non-malicious files 124 that exhibit each behavior within combination 208. Finally, signature module 106 may cause computing devices 202(1)-(N) and/or server 206 to determine that the number of malicious files 122 that exhibit each behavior within combination 208 exceeds the number of non-malicious files 124 that exhibit each behavior within combination 208 by a certain threshold.

Computing devices 202(1)-(N) generally represent any type or form of computing devices capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of receiving, storing, and/or analyzing files and behaviors exhibited by files. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing devices 202(1)-(N) and server 206.

Figure 3:
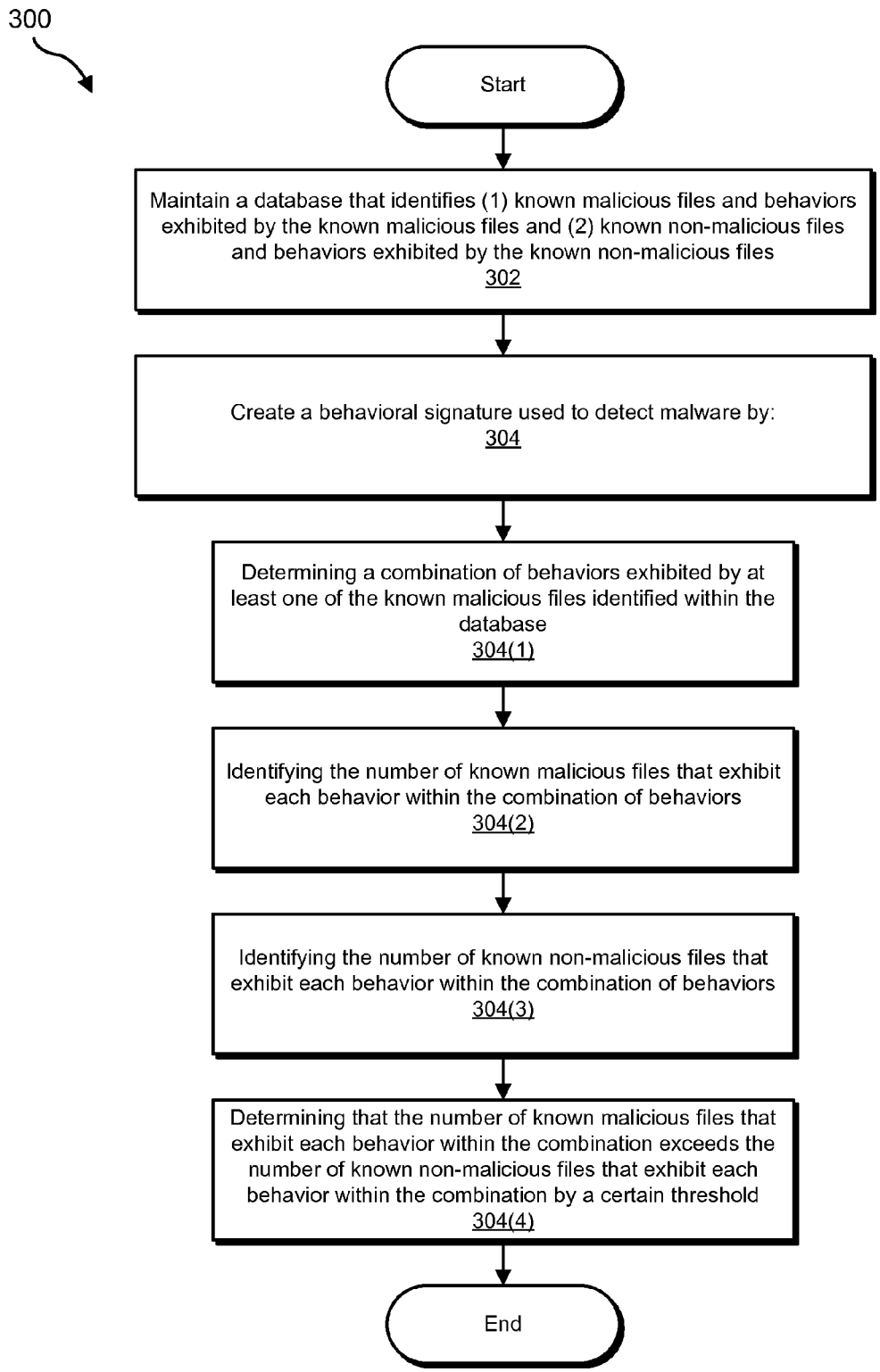
FIG. 3 is a flow diagram of an exemplary method for creating behavioral signatures used to detect malware.

FIG. 3 is a flow diagram of an exemplary computer-implemented method 300 for creating behavioral signatures used to detect malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may maintain a database that identifies (1) known malicious files and behaviors exhibited by the known malicious files and (2) known non-malicious files and behaviors exhibited by the known non-malicious files. For example, database module 104 may, as part of server 206 in FIG. 2, maintain database 120 that identifies (1) malicious files 122 and behaviors exhibited by malicious files 122 and (2) non-malicious files 124 and behaviors exhibited by non-malicious files 124.

The systems described herein may maintain a database of known malicious files and known non-malicious files in a variety of ways. In an exemplary embodiment, computing devices 202(1)-(N) and database 120 may operate as part of an anti-malware system that identifies and analyzes files accessed by endpoint devices in order to provide the endpoint devices with behavioral signatures used to detect malware. In this embodiment, database module 104 may receive malicious files 122 and/or non-malicious files 124 from one or more of computing devices 202(1)-(N). For example, computing devices 202(1)-(N) may be configured to send, to database 120, all or a portion of the files that users of computing devices 202(1)-(N) attempt to install, execute, or download. Specifically, computing devices 202(1)-(N) may send database 120 all new files that computing devices 202(1)-(N) have not previously accessed or analyzed for malicious content. In this way, database module 104 may dynamically update database 120 as new types and/or versions of malware are created and accessed by endpoint devices.

Additionally or alternatively, database module 104 may identify malicious files 122 and/or non-malicious files 124 by receiving files from additional computing devices, searching one or more additional databases, and/or crawling the web for malicious and non-malicious files. After identifying and/or receiving a file, database module 104 may store the file and/or an indication of the file within database 120. For example, database module 104 may compute and store a hash of each received file. Alternatively, database module 104 may simply store the name of each file or a unique identifier assigned to each file.

In some examples, database module 104 may determine whether each file within database 120 is known to be malicious or known to be non-malicious. In some examples, computing devices 202(1)-(N) may perform a malware analysis on each identified file before sending the file to database 120. Computing devices 202(1)-(N) may then send the result of the malware analysis (e.g., either malicious or valid) performed on the file along with the file itself.

Additionally or alternatively, database module 104 may perform (or direct an anti-malware engine to perform) any of a variety of malware analyses on the file. After identifying the result of a malware analysis performed on the file, database module 104 may store the result within database 120.

In addition to determining whether each file within database 120 is malicious or non-malicious, database module 104 may identify all or a portion of the behaviors exhibited by the files. The term "behavior," as used herein, generally refers to any type or form of action, outcome, or result produced by the execution of a file. In one example, a behavior of a file may describe any request, data, or other communication sent or received by a file, any directory or database accessed by a file, and/or any read or write operation performed by the file. Examples of behaviors include, without limitation, run key modifications, Winlogon start-ups, creation of a Preinstallation Environment (PE), variations of one or more of the same, combinations of one or more of the same, or any other behaviors.

In some examples, the malware analyses performed on malicious files 122 and non-malicious files 124 may indicate each behavior (e.g., an anti-malware engine may extract and analyze the behaviors of a file). In other examples, database module 104 may execute or analyze malicious files 122 and/or non-malicious files 124 to identify each exhibited behavior.

In some examples, database module 104 may store each identified behavior within database 120. For example, database module 104 may record each behavior and each file that exhibited the behavior. In addition, database module 104 may calculate and store the number of files that exhibit each behavior, the number of behaviors exhibited by each file, the number of devices that submitted each file, and/or any additional information associated with malicious files 122 and non-malicious files 124.

Returning to FIG. 3, at step 304 one or more of the systems described herein may create a behavioral signature used to detect malware by (1) determining a combination of behaviors exhibited by at least one of the known malicious files identified within the database, (2) identifying the number of known malicious files that exhibit each behavior within the combination of behaviors, (3) identifying the number of known non-malicious files that exhibit each behavior within the combination of behaviors, and then (4) determining that the number of known malicious files that exhibit each behavior within the combination exceeds the number of known non-malicious files that exhibit each behavior within the combination by a certain threshold. For example, signature module 106 may, as part of server 206 in FIG. 2, create signature 210 by (1) determining combination 208, (2) identifying the number of malicious files 122 that exhibit each behavior within combination 208, (3) identifying the number of non-malicious files 124 that exhibit each behavior within combination 208, and then (4) determining that the number of malicious files 122 that exhibit each behavior within combination 208 exceeds the number of non-malicious files 124 that exhibit each behavior within combination 208 by a certain threshold.

The term "signature," as used herein, generally refers to any type or form of representation, summary, tree, and/or hash used to identify all or a portion of a file. In some examples, after identifying a malicious file, an anti-malware engine may store the file or certain characteristics of the file as a signature. The anti-malware engine may then compare incoming files with the signature to determine whether the incoming files match the signature.

Moreover, the term "behavioral signature," as used herein, generally refers to any type or form of signature that contains or identifies one or more behaviors exhibited by a file or group of files. Notably, a behavioral signature may more effectively identify potentially harmful consequences of executing a file than signatures that simply indicate the contents of a file (e.g., static signatures).

The systems described herein may create a behavioral signature used to detect malware in a variety of ways. In some examples, signature module 106 may identify or select combination 208 from within the behaviors stored within database 120. In one example, signature module 106 may first identify a subset of behaviors from which to select combination 208. For example, signature module 106 may filter out behaviors that do not belong within known behavioral clusters (e.g., groups of related behaviors). Additionally or alternatively, signature module 106 may filter out behaviors that are known not to be indicative of malware.

Figure 4:
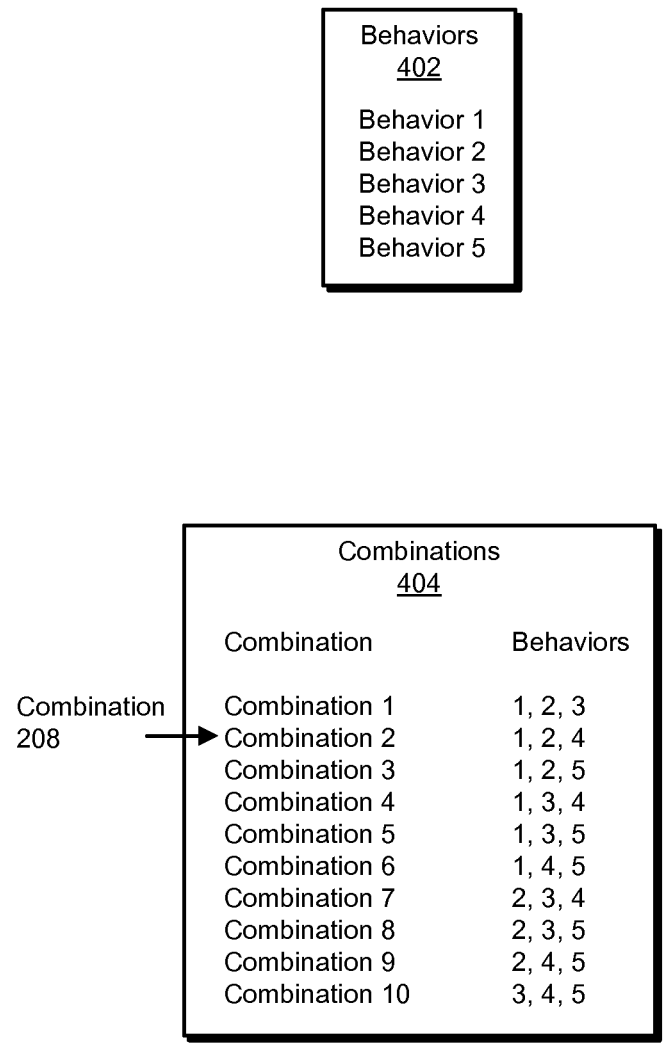
FIG. 4 is an illustration of exemplary behaviors and combinations of the behaviors.

As a specific example, FIG. 4 illustrates a set of behaviors 402 exhibited by one or more of malicious files 122 and/or non-malicious files 124. In this example, database module 104 may determine that database 120 stores five unique behaviors (e.g., behaviors 1, 2, 3, 4, and 5). After identifying behaviors 402, signature module 106 may identify combination 208 from within possible combinations of behaviors 402. In one example, signature module 106 may identify each possible combination of behaviors that may be created from behaviors 402. In other examples, signature module 106 may eliminate or filter out some possible combinations in order to more efficiently identify behavior combinations that are indicative of malware. For example, signature module 106 may identify each possible combination of behaviors 402 whose number of behaviors exceeds or meets a behavior threshold (i.e., a certain number of behaviors). As an example, signature module 106 may identify each possible combination of two behaviors and each possible combination of three behaviors. Additionally or alternatively, signature module 106 may filter out combinations whose behaviors are not subsets of known behavioral clusters.

As illustrated in FIG. 4, a set of combinations 404 may identify each possible combination of three behaviors from within behaviors 402. In this example, combinations 404 may include combinations 1-10 that are each composed of three different behaviors within behaviors 402. For example, combination 2 (composed of behaviors 1, 2, and 4) may represent combination 208.

In some examples, signature module 106 may determine whether the behaviors within combination 208 are indicative of malware. For example, signature module 106 may identify the number of malicious files 122 that exhibit each behavior within combination 208 (i.e., the malicious count of combination 208). Signature module 106 may also identify the number of non-malicious files 124 that exhibit each behavior within combination 208 (i.e., the valid count of combination 208). Signature module 106 may update the malicious and valid counts of combination 208 by scanning and/or querying database 120 (via, e.g., an SQL command).

In some embodiments, signature module 106 may determine that the number of malicious files 122 that exhibit each behavior within combination 208 exceeds the number of non-malicious files 124 that exhibit each behavior within combination 208 by the certain threshold. In one example, the certain threshold may be a number (e.g., 100, 200, etc.). In another example, the certain threshold may be a ratio of the malicious count to the valid count (e.g., 50:1, 100:1, etc.). In a further example, signature module 106 may determine that combination 208 is indicative of malware in the event that the false positive rate of combination 208 (i.e., the percentage of non-malicious files 124 that exhibit each behavior within combination 208 compared to the total number of files that exhibit each behavior within combination 208) is below a certain percentage (e.g., 1%, 2%, etc.). In general, signature module 106 may define the certain threshold using any metric or comparison of the valid and malicious counts of combination 208.

Figure 5:
FIG. 5 is an exemplary illustration of the number of malicious and non-malicious files that exhibit certain combinations of behaviors.

As an example, FIG. 5 illustrates a set of counts 502 that identifies the malicious and valid counts for combinations 1-10 shown in FIG. 4. As shown in FIG. 5, combination 208 may have a malicious count of 481 and a valid count of 3. In this example, the threshold for determining whether combination 208 is indicative of malware may correspond to a false positive rate below 1%. Signature module 106 may determine that the false positive rate of combination 208 is 3/(3+481)=0.0062, or 0.62%. As such, signature module 106 may determine that the behaviors within combination 208, when each exhibited by a certain file, indicate that the file is likely malicious. In response to determining that the behaviors within combination 208 are indicative of malware, signature module 106 may create signature 210 that summarizes or represents the behaviors within combination 208.

In some embodiments, signature module 106 may identify and compare malicious and valid counts for each of combinations 1-10. In the example of FIG. 5, signature module 106 may determine that combination 8, with a false positive rate of 0.68%, also meets the certain threshold. As such, signature module 106 may create a behavioral signature that summarizes or represents the behaviors within combination 8.

Moreover, allocation module 108 may, as part of server 206 in FIG. 2, allocate each combination across a plurality of processors for analysis. For example, allocation module 108 may assign each combination to a different processor within server 206 in order to analyze the combinations in parallel. Additionally or alternatively, allocation module 108 may assign each combination to a different computing device (not necessarily illustrated in FIG. 2) in order to analyze the combinations in parallel. In this way, allocation module 108 may decrease the time required to identify combinations of behaviors that may be used to detect malware.

As previously mentioned, the systems described herein may operate as part of an anti-malware system that creates behavioral signatures by analyzing the behaviors of files received from endpoint computing devices. In some examples, the systems described herein may distribute the created behavioral signatures to the endpoint devices to enable the endpoint devices to detect new malware threats. For example, after creating signature 210, signature module 106 may distribute signature 210 to one or more of computing devices 202(1)-(N). Computing devices 202(1)-(N) may then determine whether any files that users of computing devices 202(1)-(N) attempt to download or execute exhibit each behavior identified within signature 210.

As an example, security module 110 may, as part of computing device 202(1) and/or server 206 in FIG. 2, determine that a user of computing device 202(1) has directed computing device 202(1) to execute a file. Specifically, security module 110 may identify a system call from an application launched by the file that indicates computing device 202(1) is attempting to execute the file. Before computing device 202(1) executes the file, security module 110 may compare the file to signature 210. For example, security module 110 may determine the expected behaviors of the file and/or execute the file within an isolated or secure execution environment to identify the actual behaviors of the file. Security module 110 may then compare the identified behaviors with those behaviors summarized and/or represented by signature 210.

In some examples, security module 110 may determine that the file exhibits each behavior within signature 210. As such, security module 110 may determine that the file is potentially malicious. In response to determining that the file is potentially malicious, security module 110 may perform one or more security actions, such as preventing computing device 202(1) from executing the file, deleting the file, quarantining the file, and/or notifying a user of computing device 202(1) that the file is potentially malicious.

Additionally, in some embodiments, the systems described herein may create behavioral signatures used to detect non-malicious files. Signature module 106 may create a behavioral signature used to detect non-malicious files using a process similar to the process of creating a behavioral signature used to detect malware, as described above. Specifically, signature module 106 may identify an additional combination of behaviors exhibited by at least one of non-malicious files 124. Signature module 106 may then identify the number of non-malicious files 124 and the number of malicious files 122 that exhibit each behavior within the additional combination. Next, signature module 106 may determine that the number of non-malicious files 124 that exhibit each behavior within the additional combination exceeds the number of malicious files 122 that exhibit each behavior within the additional combination by a certain threshold (e.g., the same threshold used to create signature 210 or a different threshold). Signature module 106 may then create a behavioral signature that represents each behavior within the additional combination.

Referring to the example of FIG. 5, signature module 106 may determine that the valid count of combination 5 (i.e., 560) exceeds the malicious count of combination 5 (i.e., 5) by the certain threshold. For example, signature module 106 may determine that the false positive rate of combination 5 is 5/(5+560)=0.0089, or 0.89%. Because the false positive rate is below 1%, signature module 106 may create a behavioral signature used to detect non-malicious files that identifies each behavior within combination 5.

In some examples, signatures used to detect malware and signatures used to detect non-malicious file may be used in combination in order to more effectively determine the validity and/or legitimacy of a file. For example, determining that a file does not match any behavioral signatures used to detect malware may not completely eliminate the possibility that the file is malicious (e.g., the file may exhibit unidentified malicious behaviors). Similarly, determining that the file does match a signature containing non-malicious behaviors may more strongly indicate that the file is non-malicious.

As explained above, a server or database may receive and/or identify files that are known to be malicious and files that are known to be non-malicious. The server may then extract each behavior exhibited by the malicious and non-malicious files and identify possible combinations of behaviors (e.g., each possible combination of a certain number of behaviors). The server may then determine whether each combination of behaviors is indicative of malware. For example, for each combination, the server may identify the number of malicious files that exhibit each behavior within the combination and the number of non-malicious files that exhibit each behavior within the combination. In the event that the number of malicious files that exhibit each behavior within a combination exceeds the number of non-malicious files that exhibit each behavior within the combination by a certain threshold, the server may create a behavioral signature that represents each behavior within the combination.

Figure 6:
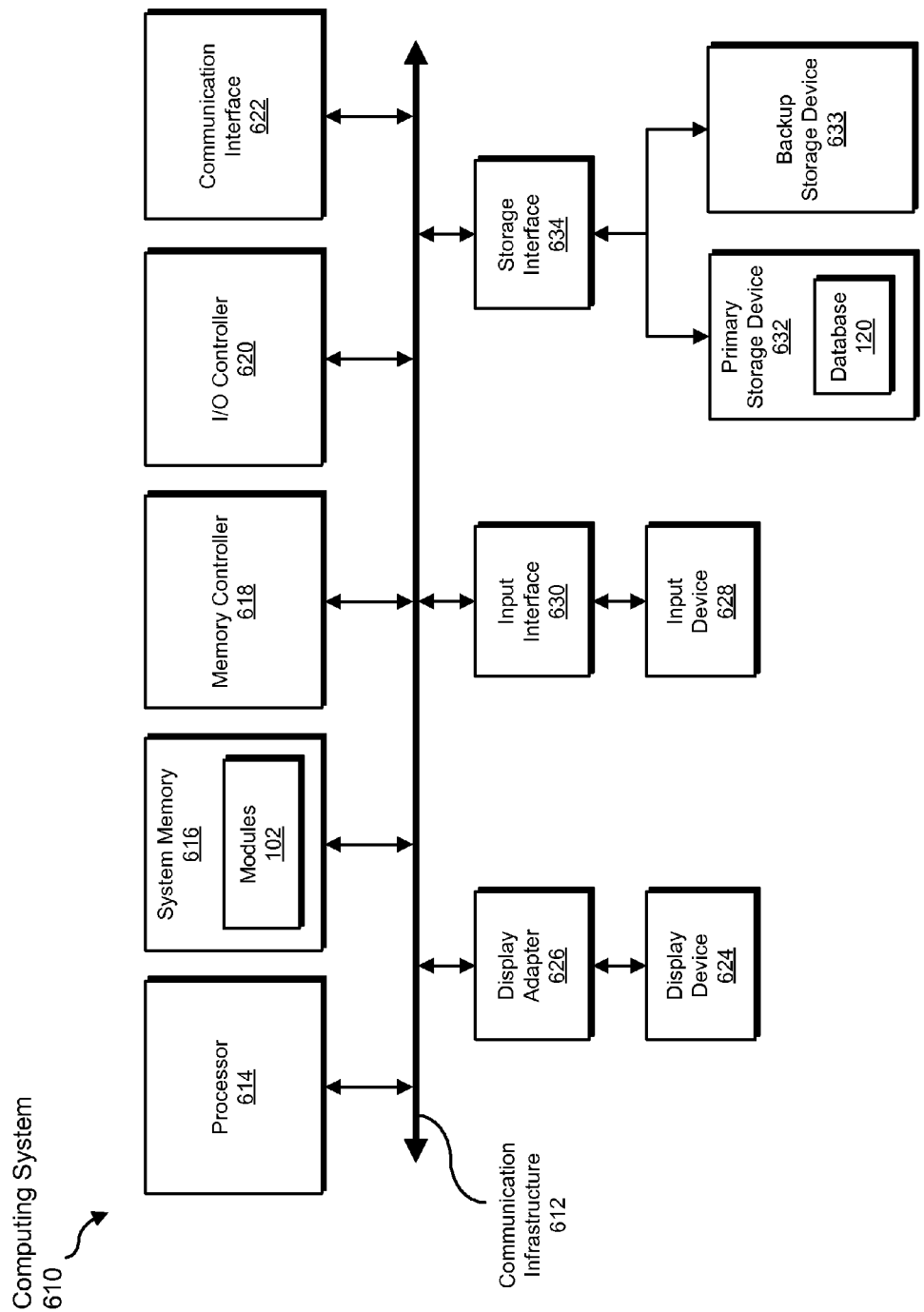
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
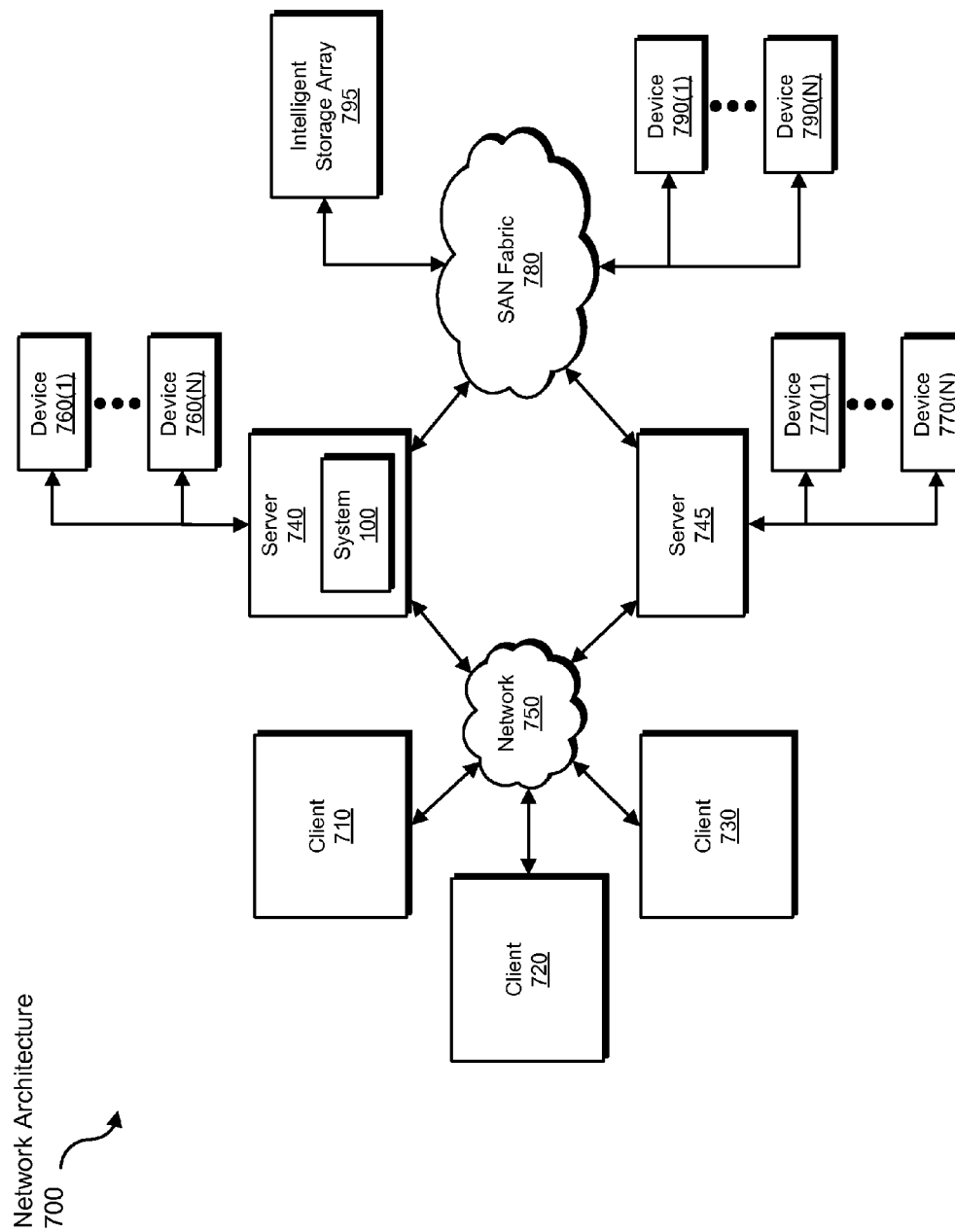
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for creating behavioral signatures used to detect malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data representative of behaviors of malicious and non-malicious files, transform the data representative of such behaviors, output a result of the transformation to one or more endpoint computing devices, use the result of the transformation to detect malware, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for creating behavioral signatures used to detect malware, at least a portion of the method being performed by a computing device comprising at least one processor, the method comprising:
   maintaining a database that identifies:
      known malicious files and behaviors exhibited by the known malicious files;
      known non-malicious files and behaviors exhibited by the known non-malicious files;
   creating a behavioral signature used to detect malware by:
      determining a combination of behaviors exhibited by at least one of the known malicious files identified within the database;
      identifying the number of known malicious files that exhibit each behavior within the combination of behaviors;
      identifying the number of known non-malicious files that exhibit each behavior within the combination of behaviors;
      determining that the number of known malicious files that exhibit each behavior within the combination exceeds the number of known non-malicious files that exhibit each behavior within the combination by a certain threshold;
      incorporating representations of each behavior within the combination of behaviors into the behavioral signature.

2. The method of claim 1, wherein maintaining the database comprises receiving the known malicious files and the known non-malicious files from at least one endpoint computing device.

3. The method of claim 1, wherein determining that the number of known malicious files that exhibit each behavior within the combination exceeds the number of known non-malicious files that exhibit each behavior within the combination by the certain threshold comprises at least one of:
   determining that the number of known malicious files exceeds the number of known non-malicious files by a certain number;
   determining that the ratio of known malicious files to known non-malicious files exceeds a certain ratio.

4. The method of claim 1, further comprising scanning the database to create at least one additional behavioral signature by:
   identifying each behavior exhibited by at least one of the known malicious files maintained in the database;
   identifying each possible combination of behaviors whose number of behaviors exceeds a behavior threshold.

5. The method of claim 4, further comprising:
   for each identified combination, determining whether the number of known malicious files that exhibit each behavior within the combination exceeds the number of known non-malicious files that exhibit each behavior within the combination by the certain threshold;
   creating a behavioral signature for each identified combination for which the number of known malicious files that exhibit each behavior within the combination exceeds the number of known non-malicious files that exhibit each behavior within the combination by the certain threshold.

6. The method of claim 5, further comprising allocating the identified combinations across a plurality of processors for analysis.

7. The method of claim 1, further comprising:
   identifying a file on an endpoint computing device;
   determining, before the endpoint computing device executes the file, that the file is potentially malicious due at least in part to the file exhibiting each behavior in the behavioral signature;
   in response to determining that the file is potentially malicious, preventing the endpoint computing device from executing the file.

8. The method of claim 1, further comprising creating a behavioral signature used to detect non-malicious files by:
   determining an additional combination of behaviors exhibited by at least one of the known non-malicious files identified within the database;
   identifying the number of known non-malicious files that exhibit each behavior within the additional combination of behaviors;
   identifying the number of known malicious files that exhibit each behavior within the additional combination of behaviors;
   determining that the number of known non-malicious files that exhibit each behavior within the additional combination exceeds the number of known malicious files that exhibit each behavior within the additional combination by another threshold.

9. A system for creating behavioral signatures used to detect malware, the system comprising:
   a database module, stored in memory, that maintains a database that identifies:
      known malicious files and behaviors exhibited by the known malicious files;
      known non-malicious files and behaviors exhibited by the known non-malicious files;
   a signature module, stored in memory, that creates a behavioral signature used to detect malware by:
      determining a combination of behaviors exhibited by at least one of the known malicious files identified within the database;
      identifying the number of known malicious files that exhibit each behavior within the combination of behaviors;
      identifying the number of known non-malicious files that exhibit each behavior within the combination of behaviors;
      determining that the number of known malicious files that exhibit each behavior within the combination exceeds the number of known non-malicious files that exhibit each behavior within the combination by a certain threshold;
      incorporating representations of each behavior within the combination of behaviors into the behavioral signature;
   at least one physical processor configured to execute the database module and the signature module.

10. The system of claim 9, wherein the database module receives the known malicious files and the known non-malicious files from at least one endpoint computing device.

11. The system of claim 9, wherein the signature module performs at least one of:
   determining that the number of known malicious files exceeds the number of known non-malicious files by a certain number;
   determining that the ratio of known malicious files to known non-malicious files exceeds a certain ratio.

12. The system of claim 9, wherein the signature module further scans the database to create at least one additional behavioral signature by:

identifying each behavior exhibited by at least one of the known malicious files maintained in the database;
identifying each possible combination of behaviors whose number of behaviors exceeds a behavior threshold.

13. The system of claim 12, wherein the signature module further:
determines, for each identified combination, whether the number of known malicious files that exhibit each behavior within the combination exceeds the number of known non-malicious files that exhibit each behavior within the combination by the certain threshold;
creates a behavioral signature for each identified combination for which the number of known malicious files that exhibit each behavior within the combination exceeds the number of known non-malicious files that exhibit each behavior within the combination by the certain threshold.

14. The system of claim 13, further comprising an allocation module that allocates the identified combinations across a plurality of processors for analysis.

15. The system of claim 9, further comprising a security module that:
identifies a file on an endpoint computing device;
determines, before the endpoint computing device executes the file, that the file is potentially malicious due at least in part to the file exhibiting each behavior in the behavioral signature;
prevents the endpoint computing device from executing the file in response to determining that the file is potentially malicious.

16. The system of claim 9, wherein the signature module further creates a behavioral signature used to detect non-malicious files by:
determining an additional combination of behaviors exhibited by at least one of the known non-malicious files identified within the database;
identifying the number of known non-malicious files that exhibit each behavior within the additional combination of behaviors;
identifying the number of known malicious files that exhibit each behavior within the additional combination of behaviors;
determining that the number of known non-malicious files that exhibit each behavior within the additional combination exceeds the number of known malicious files that exhibit each behavior within the additional combination by another threshold.

17. A non-transitory computer-readable medium comprising one or more computer-executable instructions that, when executed by at least one processor of a computing device, cause the computing device to:
maintain a database that identifies:
known malicious files and behaviors exhibited by the known malicious files;
known non-malicious files and behaviors exhibited by the known non-malicious files;
create a behavioral signature used to detect malware by:
determining a combination of behaviors exhibited by at least one of the known malicious files identified within the database;
identifying the number of known malicious files that exhibit each behavior within the combination of behaviors;
identifying the number of known non-malicious files that exhibit each behavior within the combination of behaviors;
determining that the number of known malicious files that exhibit each behavior within the combination exceeds the number of known non-malicious files that exhibit each behavior within the combination by a certain threshold;
incorporating representations of each behavior within the combination of behaviors into the behavioral signature.

18. The non-transitory computer-readable medium of claim 17, wherein the one or more computer-executable instructions cause the computing device to perform at least one of:
determine that the number of known malicious files exceeds the number of known non-malicious files by a certain number;
determine that the ratio of known malicious files to known non-malicious files exceeds a certain ratio.

19. The non-transitory computer-readable medium of claim 18, wherein the one or more computer-executable instructions further cause the computing device to scan the database to create at least one additional behavioral signature by:
identifying each behavior exhibited by at least one of the known malicious files maintained in the database;
identifying each possible combination of behaviors whose number of behaviors exceeds a behavior threshold.

20. The non-transitory computer-readable medium of claim 19, wherein the one or more computer-executable instructions further the computing device to:
determine, for each identified combination, whether the number of known malicious files that exhibit each behavior within the combination exceeds the number of known non-malicious files that exhibit each behavior within the combination by the certain threshold;
create a behavioral signature for each identified combination for which the number of known malicious files that exhibit each behavior within the combination exceeds the number of known non-malicious files that exhibit each behavior within the combination by the certain threshold.

* * * * *